(12) United States Patent
Lange et al.

(10) Patent No.: US 6,252,759 B1
(45) Date of Patent: Jun. 26, 2001

(54) CAPACITIVE PRESSURE SENSORS OR CAPACITIVE DIFFERENTIAL PRESSURE SENSORS

(75) Inventors: Jürgen Lange; Norbert Gill, both of Vellmar (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 08/404,054

(22) Filed: Mar. 14, 1995

(30) Foreign Application Priority Data

Mar. 18, 1994 (EP) .................................................. 94810168

(51) Int. Cl.$^7$ ...................................................... H01G 7/00
(52) U.S. Cl. ............................................................ 361/283.1
(58) Field of Search ................................ 361/278, 283.1, 361/283.3, 283.4; 73/716, 718, 724

(56) References Cited

U.S. PATENT DOCUMENTS

| | | | |
|---|---|---|---|
| 4,388,668 | * | 6/1983 | Bell et al. .............................. 361/283 |
| 4,531,415 | * | 7/1985 | Orlowski et al. ....................... 73/718 |
| 5,186,054 | * | 2/1993 | Sekimura ................................ 73/724 |
| 5,349,492 | * | 9/1994 | Kimura et al. ...................... 361/283.4 |
| 5,375,034 | * | 12/1994 | Foyt et al. ......................... 361/283.4 |
| 5,400,489 | | 3/1995 | Hegner et al. ...................... 29/25.41 |

FOREIGN PATENT DOCUMENTS

| | | | |
|---|---|---|---|
| 3137219 | * | 4/1983 | (DE) ...................................... 73/724 |
| 40 04 275 A1 | | 8/1991 | (DE) . |
| 0 472 108 A2 | | 2/1992 | (EP) . |
| 2101331 | * | 1/1983 | (GB) ................................ 361/283.3 |

* cited by examiner

*Primary Examiner*—Dean A. Reichard
*Assistant Examiner*—Chau N. Nguyen
(74) *Attorney, Agent, or Firm*—Bose McKinney & Evans LLP

(57) ABSTRACT

In order to avoid short-circuits between the electrodes, the pressure sensor comprises: a substrate (11) made of ceramic material, on one surface of which an electrode (13) and a glass layer (14) formed from an original glass frit are disposed; a diaphragm (12) made of ceramic material, which is permanently joined and pressure-sealed to the substrate by means of the original glass frit acting as a spacer (17) holding the diaphragm and the substrate from each other to form a cavity (16), and which on the cavity side is provided with an electrode (15); and leads (18, 19) which extend inwards and/or through the diaphragm (12) to the electrodes (13, 15) in the region of the spacer (17). The differential pressure sensor is formed in a mirror-inverted arrangement in relation to the centre plane of the substrate, so that it carries two pressure sensors. These are pressure-linked by a hole (41) filled with oil and connecting the two cavities and leading through the substrate and outwards. In a further development, thin insulating layers (20; 40, 40') made of the material of the ceramic of the substrate or of a high-temperature glass can be fixed on the glass layer(s), respectively.

4 Claims, 2 Drawing Sheets

CAPACITIVE PRESSURE SENSORS OR CAPACITIVE DIFFERENTIAL PRESSURE SENSORS

FIELD OF THE INVENTION

The invention relates to capacitive pressure sensors and capacitive differential pressure sensors.

BACKGROUND OF THE INVENTION

U.S. Pat. No. 4,388,668 describes a capacitive pressure sensor comprising:
a substrate made of ceramic material,
  on the one surface of which
    a first metallic electrode is disposed in direct contact with the substrate;
a diaphragm made of ceramic material,
  which is permanently joined and pressure-sealed to the substrate by means of an original glass frit acting as a spacer holding the diaphragm and the substrate at a defined distance from each other to form a cavity, and
  which on the surface facing the substrate is provided with a second metallic electrode; and
leads
  which extend inwards to the electrodes in the region of the spacer.

Further, U.S. Pat. No. 4,531,415 describes a capacitive differential pressure sensor, comprising:
a substrate made of ceramic material,
  whose surfaces facing away each other—the first and second surfaces—support
    a first metallic electrode and a third metallic electrode, respectively, each being in direct contact with the substrate;
a first and second diaphragm made of ceramic material,
  which are permanently joined and pressure-sealed to the first and second surfaces of the substrate, respectively, by means of an original glass frit acting as a spacer holding the diaphragms and the substrate at defined distances from each other to form a first and second cavity, respectively, and
  which on each cavity side are provided with a second and a fourth metallic electrode, respectively; and
a hole connecting the two cavities and leading through the substrate and outwards,
  the two cavities and the hole being filled with oil.

With the two types of pressure sensors mentioned, the prevention of short-circuits between the electrodes facing each other is important. Such short-circuits may be caused by material particles coming between the electrodes during manufacture and not being discovered there, or during operation by pressures which are higher than the pressure admissible for a concrete type of pressure sensor and which thus lead to contact between the electrodes, or through parts of the electrodes detaching themselves from the diaphragm and/or substrate and contacting each other again.

According to U.S. Pat. No. 4,531,415 already mentioned, an attempt was made to solve the short-circuit problem by fixing to the substrate some parts of insulating material protruding from the electrodes as projections, so that in case of an inadmissible high pressure the electrodes of the diaphragm can be intercepted by the projections and thus cannot touch the electrodes of the substrate.

SUMMARY OF THE INVENTION

This design, however, only eliminates the second cause of a short-circuit described above, while the two other causes are not precluded. The invention therefore serves for a general solution to the short-circuit problem.

To this end, the invention consists on the one hand of a capacitive pressure sensor, comprising:
a substrate made of ceramic material,
  on one surface of which
    a first metallic electrode is disposed and
    a glass layer formed from an original glass frit is disposed at least on the first metallic electrode;
a diaphragm made of ceramic material,
  which is permanently joined and pressure-sealed to the substrate by means of the original glass frit acting as a spacer holding the diaphragm and the substrate at a defined distance from each other to form a cavity, and
  which on the cavity side is provided with a second metallic electrode; and
leads
  which extend inwards and/or through the diaphragm to the electrodes in the region of the spacer.

The invention consists on the other hand of a capacitive differential pressure sensor, comprising:
a substrate made of ceramic material,
  whose surfaces facing away each other—the first and second surfaces—support
    a first metallic electrode and a third metallic electrode, respectively,
    a first glass layer formed from an original glass frit at least on the first metallic electrode,
    a second glass layer formed from the original glass frit at least on the third metallic electrode;
a first and a second diaphragm made of ceramic material,
  which are permanently joined and pressure-sealed to the first and second surfaces of the substrate, respectively, by means of the original glass frit acting as a spacer holding the diaphragms and the substrate at defined distances from each other to form a first and a second cavity, respectively, and
  which on each cavity side are provided with a second and a fourth metallic electrode, respectively;
leads,
  which extend inwards and/or through the first and the second diaphragm, respectively, or through both diaphragms to the respective electrodes; and
a hole connecting the two cavities, leading at least through the substrate and outwards,
  the two cavities and the hole being filled with oil.

In accordance with a development of the pressure sensor of the invention, a thin insulating layer made of the ceramic material of the substrate or of a high-temperature glass is disposed on the glass layer covering the first electrode, the diaphragm being permanently joined to the insulating layer via the spacer.

In accordance with a development of the differential pressure sensor of the invention, thin insulating layers made of the ceramic material of the substrate or of a high-temperature glass are disposed on the glass layers covering the first and the third electrodes, respectively, the respective diaphragms being permanently joined to the respective insulating layers by means of the respective spacers.

The glass layer disposed on the electrode of the substrate ensures that no short-circuits whatsoever can occur between the electrodes of the substrate and of the diaphragm, since one of the electrodes is completely covered with a coating of insulating material.

Furthermore, the electrodes of the substrate are protected substantially completely against any moisture that can enter the cavity of the pressure sensor first referred to above when said sensor is not used as an absolute pressure sensor with evacuated cavity but as a reference pressure sensor with a cavity which is connected to the environment by means of an aperture, cf. U.S. Pat. No. 5,079,953, or which may be contained as a water content in the oil filling in the differential pressure sensor referred to above in second position. This moisture protection increases the long-term stability of the pressure sensor and/or the differential pressure sensor.

BRIEF DESCRIPTION OF THE DRAWINGS

The invention will now be explained in more detail with reference to embodiments shown in the figures of the drawing. For ease of illustration these figures are not true to scale; like parts of them have the same reference numerals.

DETAILED DESCRIPTION OF THE DRAWINGS

Figure 1:
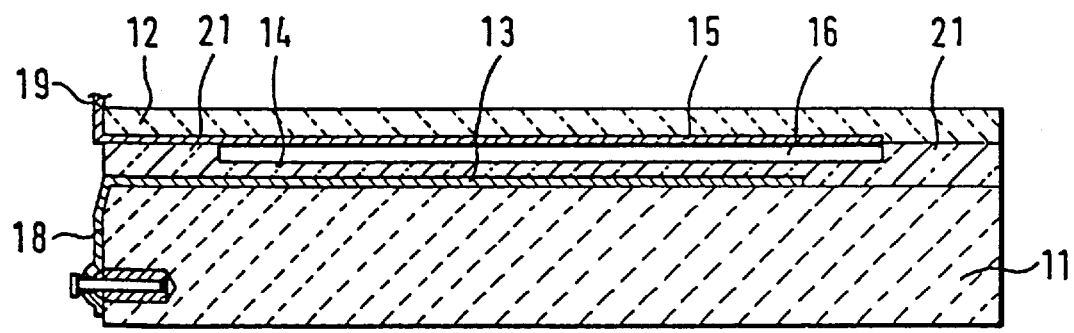
FIG. 1 shows a cross-section of a capacitive pressure sensor.

The capacitive pressure sensor of the embodiment shown in cross-section in FIG. 1 comprises a substrate 11 and a diaphragm 12, each of which consists of ceramic material, preferably the same ceramic material. Highly pure alumina is particularly suitable for this purpose. In the top view not shown the substrate and the diaphragm are preferably circular or rectangular. A first metallic electrode 13 and a glass layer 14 formed from an original glass frit are disposed on the one surface of the substrate 11.

Figure 2:
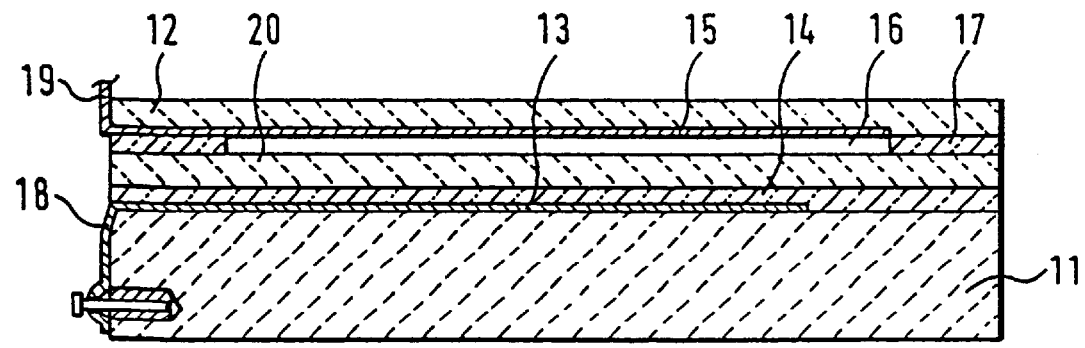
FIG. 2 shows a cross-section of a development of the capacitive pressure sensor shown in FIG. 1.

The substrate 11 and the diaphragm 12 form a cavity 16 since they are permanently joined and pressure-sealed to each other along the respective edges 21 at a defined distance of e.g. 20 $\mu$m by means of the material of the original glass frit as a spacer in a manner equivalent to spacer 17 in FIG. 2.

The diaphragm 12 is provided with a second metallic electrode 15 on the cavity side. Therefore, the two electrodes 13, 15 form a capacitor whose dielectric consists partly of the glass layer 14 and partly of air or vacuum.

Leads 18 and 19 extend to the electrodes in the direction of the cavity in the region of the glass layer 14. It is also possible that the electrode 15 of the diaphragm 12 extends through it to the outside.

During the manufacture of the capacitive pressure sensor the glass frit is disposed as a layer to the surface of the substrate 11 containing the electrode 13, preferably over the whole surface. At the edges 21 the thickness of the layer is increased in such a way that the spacer is formed after a heating step which serves to melt the glass frit. Therefore, at the edges 21 the spacer forms one piece with the glass layer 14. The increase mentioned above can, for example, be achieved by attaching a glass frit ring to the glass frit layer and the inner side of the diaphragm, respectively.

In the development of the capacitive pressure sensor according to FIG. 1 shown in cross-section in FIG. 2, a thin insulating layer 20, consisting of the ceramic material of the substrate 11 or of such a high-temperature glass that an adequate bond with the spacer 17 which is subject to shear stress in case of overloading, is guaranteed, is fixed to the uniformly thin glass layer 14 which in turn was formed from a glass frit after said frit had been heated.

In this case the glass layer 14 is not reinforced at the edge as in FIG. 1, but the spacer 17 is formed by a glass frit ring fixed to the edge of the insulating layer 20.

Figure 3:
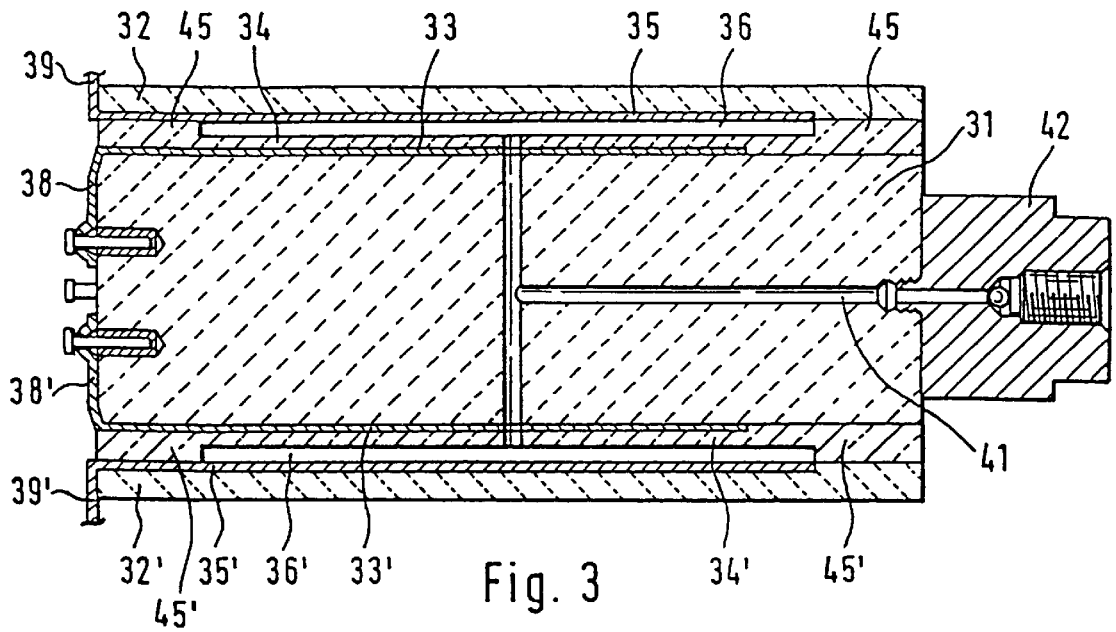
FIG. 3 shows a cross-section of a capacitive differential pressure sensor.

The differential pressure sensor shown in FIG. 3, which shows it in cross-section, comprises a substrate 31 and a first diaphragm 32 as well as a second diaphragm 32', each of which consists of ceramic material, preferably the same material. Highly pure alumina is particularly suitable again for this purpose. Here too, the substrate and the diaphragms in the top view, which is not shown, are preferably circular or rectangular.

On the surfaces of the substrate 31 facing away each other, structures are present in a substantially mirror-inverted arrangement with respect to the centre plane of the substrate. Thus a first metallic electrode 33 is located on a first surface and a third metallic electrode 33' on a second surface. A first and a second glass layer 34, 34', each of which was formed from an original glass frit, are disposed on the these electrodes, respectively.

Figure 4:
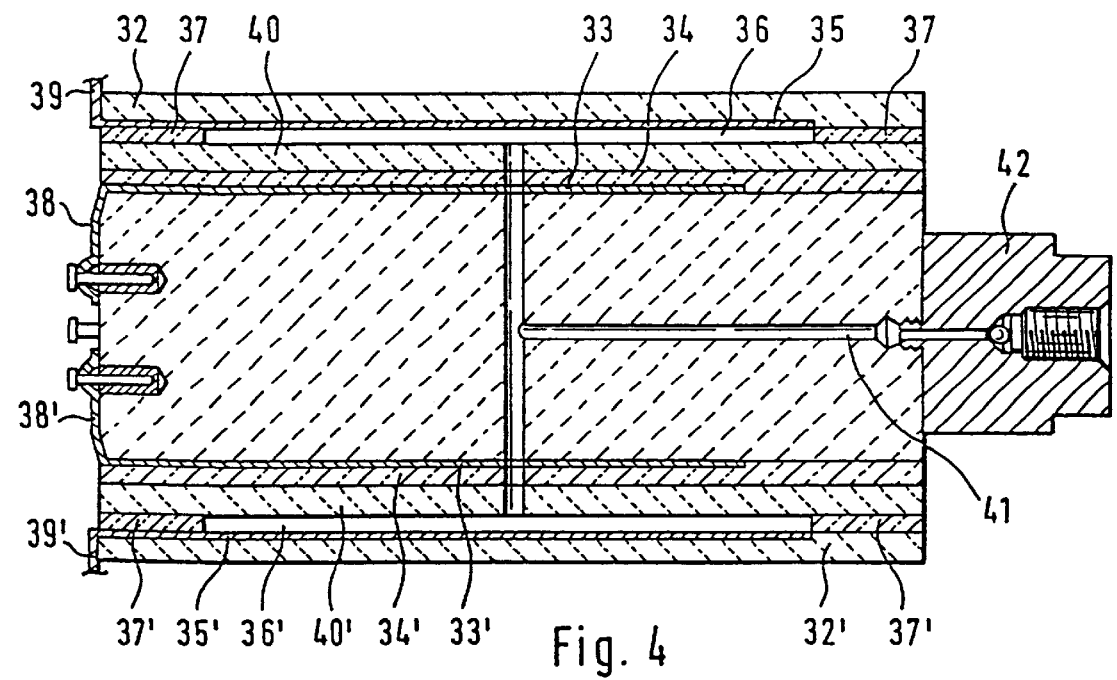
FIG. 4 shows a cross-section of a development of the capacitive differential pressure sensor shown in FIG. 3.

The substrate 31 with the diaphragm 32 forms a first cavity 36 and with the diaphragm 32' a second cavity 36' since the diaphragms 32, 32' are permanently joined and pressure-sealed to the first and second surfaces of the substrate, respectively, along the respective edges 45, 45' at a defined distance of e.g. 20 $\mu$m by means of the material of the original glass frit as respective spacers in a manner equivalent to spacers 37, 37' in FIG. 4.

The diaphragms 32, 32' are each provided with a second metallic and a fourth metallic electrode 35, 35' on the cavity side. Thus the pairs of electrodes 33, 35 and 33', 35' each form a first and a second capacitor, whose dielectric consists partly of the respective glass layers 34, 34' and partly of oil (see below) or air or vacuum.

Leads 38, 38', 39, 39' extend to the electrodes in the direction of the respective cavity in the region of the glass layers 34, 34'. It is also possible that the electrodes 15, 15' of the diaphragms 32, 32' extend through them to the outside, respectively.

What was said in explaining FIG. 1 concerning the disposal and heating of the glass frit applies by analogy to FIG. 3.

In the development of the capacitive differential pressure sensor according to FIG. 3 shown in cross-section in FIG. 4, a first and a second thin insulating layer 40, 40' consisting of the ceramic material of the substrate 31 or of a high-temperature glass are fixed to the uniformly thin glass layers 34, 34' which in turn were formed from a glass frit after said frit had been heated.

In this case too, the glass layers 34, 34' are not reinforced at the edges as in FIG. 3, but the spacers 37, 37' are formed by a glass frit ring fixed to each edge of the insulating layers 40, 40'.

The two versions of the differential pressure sensor as shown in FIGS. 3 and 4 also have a hole 41 connecting the two cavities 36, 36' and leading through the substrate 31 as well as through the layers arranged between it and the respective cavities as well as outwards. This hole and the cavities are filled with oil which has been poured in through a connection piece 42.

The ceramic or high-temperature glass insulating layers have, for example, a thickness of approx. 150 $\mu$m if they are attached as prefabricated parts. If required, even thinner insulating layers (down to 40 $\mu$m) can be achieved, when the insulating layer is applied more thickly and then reduced by grinding.

What is claimed is:

1. A captive pressure sensor comprising:

a substance made of ceramic material, the substrate having a first surface, a first metallic electrode disposed on the first surface, a glass layer formed from a original glass frit disposed on the first metallic electrode, a space formed from the original glass frit, a diaphragm made of ceramic material permanently joined and pressure-sealed to the substrate by means of the glass layer and spacer holding the diaphragm and the substrate at a defined distance form each other to form a cavity, the diaphragm including a cavity side facing toward the cavity, a second metallic electrode disposed on the cavity side of the diaphragm; and a thin insulating layer made of at least one of the ceramic material of the substrate and a high-temperature glass disposed on the glass layer covering the first electrode, wherein the diaphragm is permanently joined to the insulating layer by the spacer.

2. A differential pressure sensor, comprising:

a substrate made of ceramic material, the substrate including first and second surfaces facing away from each other, a first metallic electrode disposed on the first surface, a third metallic electrode disposed on the second surface, a first glass layer formed from an original glass frit disposed on the first metallic electrode, a second glass layer formed from the original glass frit disposed on the third metallic electrode, a first and second spacer formed from the original glass frit, a first and a second diaphragm made of ceramic material permanently joined and pressure-sealed to the first and second surfaces of the substrate, respectively, by means of the first and second glass layers and the first and second spacers holding the diaphragms and the substrate at defined distances from each other to form a first and second cavity, respectively, the first and second diaphragms including first and second cavity sides, respectively, facing toward the first and second cavity, respectively, a second metallic electrode disposed on the first cavity side, a fourth metallic electrode disposed on the second cavity side, and first and second thin insulating layers made of at least one of the ceramic material of the substrate and a high-temperature glass disposed on the first and second glass layers covering the first and the third electrodes, respectively, wherein the first and second diaphragms are permanently joined to the respective first and second insulating layers by the first and second spacers.

3. A capacitive pressure sensor comprising a substrate having a first surface, a first metallic electrode appended to the first surface of the substrate, a diaphragm having a first surface facing toward the substrate, a second metallic electrode appended to the first surface of the diaphragm, a glass layer having a first end appended to the substrate and a second end, an insulating layer situated between the second end of the glass layer and the diaphragm, and a spacer situated between the diaphragm and insulating layer, the spacer, insulating layer, and glass layer defining a cavity.

4. A differential pressure sensor, comprising a substrate having first and second surfaces facing away from each other and an outside surface, a first metallic electrode situated on the first surface, a third metallic electrode situated on the second surface, a first diaphragm having a first side facing toward the first surface of the substrate and the first metallic electrode, a second diaphragm having a first side facing toward the second surface of the substrate and the third metallic electrode, a second metallic electrode appended to the first side of the first diaphragm, a fourth metallic electrode appended to the first side of the second diaphragm, a first glass layer appended to the first metallic electrode, a second glass layer appended to the third metallic electrode, a first insulating layer appended to the first glass layer and situated between the first diaphragm and the substrate, a second insulating layer appended to the second glass layer and situated between the second diaphragm and the substrate, a first spacer situated between the first diaphragm and first insulating layer, the first spacer, second metallic electrode, and first insulating layer defining a first cavity, and a second spacer situated between the second diaphragm and second insulating layer, the second spacer, fourth metallic electrode, and second insulating layer defining a second cavity, and the substrate being formed to include an aperture connecting the first and second cavities and the outside surface of the substrate.

* * * * *